Patented Jan. 9, 1945

2,367,036

UNITED STATES PATENT OFFICE 2,367,036

PROCESSES OF COLOR PHOTOGRAPHY AND COMPOSITIONS AND ARTICLES THEREFOR UTILIZING POLYMERIC COLOR FORMERS

David M. McQueen, Wilmington, Del., assignor, by mesne assignments, to E. I. du Pont de Nemours & Company, Wilmington, Del., a corporation of Delaware No Drawing. Application October 31, 1940, Serial No. 363,789

17 Claims. (Cl. 95—6)

This invention relates to color photography. More particularly it relates to photographic elements, emulsions and developers containing novel high molecular dye intermediates or color formers and to processes of forming dye images with such elements and compositions.

This invention has for an object the production of new photographic compositions and elements which may be used in processes of color photography. A further object is to provide layers composed of colloidal dispersions of dye intermediates which are immobile and do not migrate therefrom during storage or processing. A still further object is to provide stable dye intermediates which form dye images of good tinctorial strength and color and haze-free. Still another object is to provide color former compositions which do not affect the sensitivity of silver halide emulsions. Still other objects will be apparent from the following detailed description.

In its broader aspects the invention involves the preparation and use of photographic compositions having uniformly distributed therethrough a polymer obtained by reacting a carbonyl compound taken from the group consisting of aldehydes and ketones, hereinafter referred to as a ketaldone, with an active methylene color former containing at least two ketaldone-reactive groups, at least one of which is an active methylene group.

To be more specific the photographic compositions may comprise organic colloidal dispersions or emulsions containing the polymers described in amounts sufficient to form a dye image of the proper strength for visual purposes upon color coupling development which may form layers of a photographic element. The layers may contain in addition to the polymers, light sensitive materials such as silver salts and emulsion stabilizers, sensitizing dyes, fog inhibitors, etc. However, in certain aspects of the invention the layers may contain the polymers as the sole types of developer-responsive materials. To be more specific the polymers can be used in layers free from light sensitive silver salts.

Various types of organic colloids can be used as the binding agents for the dispersions or emulsions. Suitable colloids exhibiting high viscosity characteristics and appreciable jelly strength which can be used as binding agents include gelatin, albumin, agar-agar, Irish moss, and synthetic resins, e. g. polyvinyl alcohol, etc.

In preparing the polymers a dye intermediate containing at least two aldehyde-reactive groups, at least one of which is an active methylene group is dissolved in a solvent medium preferably an aqueous solution which may be acid, neutral, or alkaline, preferably the latter, and the ketaldone admixed therewith. The reaction is allowed to continue until the condensation proceeds to the desired extent. Insoluble products are not generally desired and for this reason it is advantageous to stop the reaction before the polymer begins to precipitate in material amounts from alkaline solutions.

The temperature and time of the condensation varies considerably depending on the reactivity of the ketaldone and particular active methylene color former. A practical range may thus vary from 0° C. to reflux temperatures and from a few minutes to several hours.

A convenient way to determine a desirable end point for the reaction is to dissolve the active methylene compound in aqeuous alkali, add the ketaldone and allow the reaction to proceed until the beginning of turbidity. Ammonia or an amine is added to inactivate the ketaldone. The resulting solution containing the product can then be purified by various suitable methods, e. g. dialysis or precipitation with dilute acids and washing.

The active methylene compounds may be taken from several general classes such as bis-acylacetamides, including those derived from aliphatic and arylene diamines and certain heterocyclic amines and diamines by condensation with acylacetic esters and aliphatic, aromatic, or heterocyclic compounds such as esters of acetoacetic, benzoylacetic, naphthoylacetic, furoylacetic, picolinoylacetic and thienoylacetic and cyanoacetic acid esters, and amino pyrazolones. The last-mentioned compounds constitute a preferred embodiment of the invention. The compounds may contain various substituents in the hydrocarbon nuclei, e. g. chlorine, bromine, alkyl, aralkyl, aryl, etc.

The proportions of reactants are so chosen that there is at least one mol of ketaldone present for every two mols of aldehyde reactive group in the active methylene color former. A small excess of ketaldone does not appear to have a deleterious effect.

The polymers can be added to organic colloidal dispersions in various ways. A practical manner involves dissolving the purified polymer in aqueous alkali, usually with the addition of a small amount of a water-soluble organic solvent, and admixing it with the organic colloid which may be a photographic emulsion. The dispersions are then cast on a suitably subbed film base or on an organic colloid layer or water permeable membrane to form, for example, single or multilayer elements for color photography.

In the following examples which shall further illustrate the invention, but are not intended in limitation thereof the quantities stated are parts by weight.

*Example I*

Eighteen and nine-tenths parts of 1-meta-aminophenyl-3-methyl-5-pyrazolone is dissolved in 50 parts water containing 20 parts of 20% sodium hydroxide. The solution is cooled to 5° C. and 9 parts of 37% formaldehyde solution added. The solution is then allowed to stand overnight at room temperature and 250 parts water and 10 parts 20% sodium hydroxide are added. The mixture is heated for one-half hour on the steam bath, filtered, and cooled. From the filtrate a gelatinous resin is precipitated by stirring in dilute acetic acid. After drying in air, a small portion of the polymer is dissolved in dilute alkali, incorporated in a gelatino-silver chlorobromide photographic emulsion and coated on a suitably subbed cellulose acetate film base. Upon exposure to an object field, development with p-aminodiethylaniline and removal of silver and silver salts a bright magenta dye image is obtained.

*Example II*

Eighteen parts 1-meta-aminophenyl-3-methyl-5-pyrazolone is suspended in 100 parts water and 20% sodium hydroxide added until the solid just dissolves. The solution is cooled to 5° C. and 9 grams acetaldehyde added. At this point a precipitate appears and 2 parts of 20% hydroxide is added to dissolve it. The solution is then heated at 90° for 1.25 hours and allowed to stand overnight. Heating is continued for three hours at 90°, a small amount of sodium hydroxide added to remove the turbidity and the mixture filtered. The filtrate is precipitated by adding dilute acetic acid, finally yielding a gelatinous resin. One hundred parts saturated sodium chloride brine is then added and the mixture heated to coagulate the gelatinous solid. After standing overnight the mixture is again filtered and dried in an oven at 60° C. The resin is then powdered and extracted with boiling water for 23 hours. After drying 17 parts of a resin soluble in dilute aqueous alkaline solution is obtained. This material when incorporated in a photographic silver halide emulsion, exposed and developed with a p-aminodiethylaniline developer, yields a magenta picture similar to that obtained under Example I.

*Example III*

Ten parts of s-bis[meta-(3-methyl-5-pyrazolon-1-yl)phenyl]urea of formula

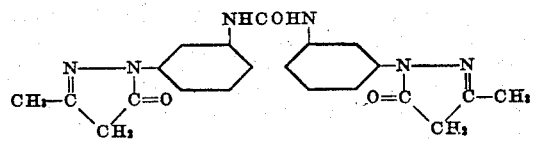

is dissolved in 100 parts water containing 15 parts 20% sodium hydroxide solution. A trace of sodium dodecyl sulfate is added to facilitate solution. Twenty parts acetone is then added and the solution refluxed on the steam bath for one and one-half hours. The resulting solution is purified from low-molecular weight constituents by dialysis in a cellulose membrane. During one week's dialysis in running water, the product precipitates and is removed and filtered. The compound is suitable for color coupling development with aryl hydrazines and arylene diamine developing agents.

*Example IV*

Eighteen parts 1-meta-aminophenyl-3-methyl-5-pyrazolone is dissolved in 100 parts water containing 20 parts 20% sodium hydroxide. To this solution at 70° is added a solution of 8.8 parts of benzaldehyde-o-sulfonic acid (at 70°) to which has been added a small amount of 20% sodium hydroxide until slightly alkaline. From the mixture a solid precipitates which is filtered and extracted with hot water. The compound is suitable for color coupling devedopment with aryl hydrazines and arylene diamino developing agents.

*Example V*

Eighteen parts 1-meta-aminophenyl-3-methyl-5-pyrazolone is suspended in 100 parts water and sufficient 20% sodium hydroxide is added to make the solid just dissolve. The solution is then cooled to 5° C. and 48 parts of a 75% paste of dimethylolurea is added. The mixture is heated for one-half hour on the steam bath during which time the dimethylolurea goes into solution and finally a precipitate begins to separate. Thirteen and one-half parts of concentrated ammonia solution is added and the mixture allowed to stand overnight. An additional twenty-seven parts of concentrated ammonia solution is then added, the mixture allowed to stand one-half hour, acidified with dilute acetic acid, filtered, and the precipitate is again dissolved in dilute sodium hydroxide. After filtration and reprecipitation wtih dilute acetic acid, a light gray solid is obtained. After drying in an oven at 60° C. it is found to be still soluble in dilute aqueous alkali. It can be dispersed in gelatin emulsions and forms excellent dye images on color coupling development.

*Example VI*

Eight and five-tenths parts s-bis[meta-(3-methyl-5-pyrazolon-1-yl)phenyl]urea is dissolved in 100 parts water containing 15 parts 20% sodium hydroxide and a trace of sodium dodecylsulfate. At room temperature, a solution of 6.8 parts trimethylolnitromethane in 24 parts ethanol is added to the solution of the pyrazolone derivative and the mixture allowed to stand overnight at room temperature. The resulting solution is freed from low molecular weight materials by dialysis in a regenerated cellulose membrane. During one week's dialysis, a solid precipitates and the mixture is removed and filtered. A light colored solid is obtained. It can be dispersed in gelatin emulsion and forms excellent dye images on color coupling development.

*Example VII*

Ten parts of s-bis[meta-(3-methyl-5-pyrazolon-1-yl)phenyl]urea is dissolved in 100 parts water containing 15 parts 20% sodium hydroxide. At 5° C. to this is added a solution of 11 parts of benzaldehyde-o-sodium sulfonate monohydrate in 50 parts water. The mixture is allowed to stand one-half hour at room temperature and 1.4 parts of 37% formaldehyde solution is added. The mixture is then allowed to stand at room temperature for 18 hours at which point it begins to gel.

Four and five-tenths parts concentrated ammonia is added and the mixture stirred for one-half hour. At the end of this time it is precipitated by adding a solution of dilute acetic acid, filtered, washed with water, redissolved in dilute sodium hydroxide, and reprecipitated with acetic acid. After washing thoroughly, and drying, a light colored resin soluble in dilute alkaline solutions is obtained. It can be dispersed in gelatin emulsions and forms excellent dye images on color coupling development.

Example VIII

Twenty-eight parts of bis-acetoacetbenzidide of formula

is dissolved in 200 parts water containing 40 parts 20% sodium hydroxide and 67.5 parts dimethylformamide. The mixture is heated to 90°, filtered and 36 parts of benzaldehyde o-sodium sulfonate monohydrate added. The solution is then allowed to stand for three hours and dialyzed to remove low molecular weight constituents. A small portion of the solution is added to a gelatino silver chlorobromide photographic emulsion coated on subbed cellulose acetate film and exposed and developed with a p-aminodiethylaniline developer. A yellow picture is obtained upon removal of the silver and silver salts.

Example IX

Twenty parts of bis-acetoacet-p-phenylenediamine of formula

is dissolved in 180 parts water containing 29 parts 20% sodium hydroxide and 9 parts ethanol. To this solution is added 14.7 parts benzaldehyde o-sodium sulfonate in 65 parts of water containing 14.5 parts 20% sodium hydroxide. The mixture is heated two hours on a steam bath, filtered and cooled. Upon addition of dilute acetic acid, a yellow solid precipitates. After extraction with water, a portion of the solid resin is dissolved in dilute sodium hydroxide and incorporated in a gelatino silver chloride-bromide-iodide photographic emulsion. After exposure, development with p-aminodiethylaniline, and removal of silver salts, a yellow picture is obtained.

Example X

Ten parts acetoacetsulfanilamide of formula

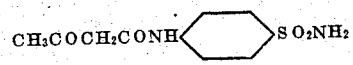

is dissolved in 200 parts water to which is added sufficient 20% sodium hydroxide solution to just dissolve it. A solution of 3.5 parts benzaldehyde o-sodium sulfonate in 25 parts of water containing just sufficient 20% sodium hydroxide to make it alkaline is added to the first solution at room temperature. After heating one-half hour on the steam bath, the mixture is cooled to 5° C. and 2.8 parts of 37% formaldehyde solution is added. After standing for three hours, a light colored solid is precipitated by addition of dilute acetic acid. Upon filtering and washing the material is dissolved in dilute sodium hydroxide solution, incorporated in a photographic emulsion. After exposure and color development with a p-aminodiethylaniline developer solution, a yellow picture is formed.

Example XI

Two parts (p-aminobenzoyl)acetanilide of formula

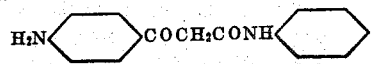

is dissolved in 50 parts water containing 2 parts 20% sodium hydroxide and 67.5 parts ethanol. The mixture is heated to 80° C. and 3 parts of a 75% paste of dimethylolurea is added. This dissolves immediately and the solution is allowed to stand until the first evidence of turbidity appears—approximately ten minutes. Four and five-tenths parts concentrated ammonia solution is then added and, after standing 15 minutes, the mixture is filtered and allowed to stand overnight. The filtrate is precipitated by making just neutral with dilute acetic acid and filtered. A small portion of the light colored solid is dissolved in dilute alkali and coated in a photographic silver halide emulsion. After exposure and development with a p-aminodiethylaniline developer, a yellow picture is obtained.

Example XII

Eighteen parts 1-meta-aminophenyl-3-methyl-5-pyrazolong is dissolved in 100 parts water containing 20 parts 20% sodium hydroxide. To this at room temperature is added a solution of 8.8 parts of benzaldehyde o-sodium sulfonate in 50 parts water. Acetic acid is then added until the originally precipitated solid redissolves. The solution is held at 5° C. and 6 parts formaldehyde added. After standing 16 hours at room temperature, the light colored solid is filtered, washed with water and dried. Twenty-one parts of resin is obtained. This is coated in photographic emulsion, exposed and color developed with a p-aminodiethylaniline developer solution. A brilliant magenta picture is obtained.

The invention is not limited to the specific ketaldone reactants set forth in the proceding examples. On the contrary, a wide variety of such compounds may be used with any of the active methylene compounds hereof. From the standpoint of economy and ease of reaction, the lower aliphatic ketaldones are preferred, such as formaldehyde, acetaldehyde, acetone, methylethyl ketone, diethyl ketone. Other ketaldones include propionaldehyde, n-butyraldehyde, isobutyraldehyde, n-heptaldehyde, aldol, glyoxal, 2-ethylhexenal, benzaldehyde, cinnamaldehyde, o-nitrobenzaldehyde, phenylacetaldehyde, mesityl oxide, diethylketone, cyclohexanone, cyclopentanone, acetophenone, and benzophenone. The use of aldehydes containing solubilizing groups such as carboxylic acid groups and sulfonic acid groups constitutes a further preferred group of useful ketaldones. Additional agents of this type include glyoxylic acid and phthalaldehydic acid. In place of the ketaldone we can use materials reacting as ketaldones, particularly methylol compounds and of these more particularly the methylolamides and methylolamines such as dimethylolurea, methylourea, dimethyloladipamide, trimethylolmelamine, and dimethylolguanidine and methylollauramide. Mixtures of the above can be used, if desired.

The active methylene color formers as previously indicated must contain one active methylene group and at least one other ketaldone-reactive group. The other ketaldone-reactive groups may be (1) active methylene groups and (2) groups containing a nitrogen atom which is capable of reacting with formaldehyde in an aqueous system of pH 8 at a temperature of 40° C. Suitable groups of type (2) which constitutes the preferred embodiment hereof include the group consisting of primary amine (—NH₂), secondary amine, (—NHR), primary amide (—CONH₂), primary sulfonamide (—SO₂NH₂), or secondary sulfonamide (—SO₂NHR) groups. The active methylene color formers may be of any known type including those containing an acyclic methylene group and those having an intracyclic methylene group, e. g. pyrazolones, suitable ones being described in U. S. Patent 2,200,924, 3-hydroxythio-naphthenes, 3 - hydroxy-coumarones, isoxazolones, acylacetic esters or amides, useful ones being described in U. S. Patents 2,133,937 and 2,140,540, 1,3-diketones, and cyanacetic esters or amides, useful ones being described in U. S. Patent 2,182,815, the addition products of pyridine and its derivatives, such as picoline, 3-amino pyridine, dipyridine, quinoline, etc., with an α-halogen ketone, e. g. chloroacetophenone, bromoacetophenone, monochloroacetone, symmetrcal dichloracetone, bromacetonaphthone, etc. The compounds, however, must contain the additional ketaldone-reactive group as specified. Suitable members of these classes substituted with another aldehyde-reactive group include besides those described in the examples, 1-p-amiophenyl-3-methyl-5-pyrazolone, 1,1'-p-phenylene-bis-3-methyl-5-pyrazolone, s-bis [meta-(3-methyl-5-pyrazolon-1-yl)phenyl] adipamide, 6-amino-3-hydroxythionaphthene, 6 - amino - 3 - hydroxycoumarone, 5-carbonamido-3-hydroxythionaphthene, benzoylacetsulfanilamide, p-aminocyanacetanilide, ethyl N-p-aminophenyl-malonamate and di(p-amino-benzoyl)methane. The pyrazolone derivatives are preferred in view of their reactivity and availability and the excellent polymeric dye intermediates formed.

Any suitable solvent medium for the reactions may be used. The solvents chosen should, however, be inert and not enter into the condensation reaction. Aqueous systems have been found of most general applicability and as described in the examples may be acid or alkaline. In general, active methylene color formers are soluble in alkaline systems, by virtue of salt formation. In some instances the presence of a water-miscible organic solvent is necessary to produce a satisfactory solution. Reaction media containing alkali and a water miscible organic solvent are preferred.

Varying with the reactivity of the ketaldones, the reaction temperature may be between 0° C. and below to 200° C. and above. Temperatures of 0° C. to 75° C. are preferred. The time of the reaction may vary within equally wide limits such as 5–10 minues to 25 hours. With the more reactive ketaldones such as formaldehyde the reaction need be carried no longer than one or two hours at 0–5° C. while with a more unreactive ketaldone such as acetophenone, it is desirable to use a higher temperature and a longer time of reaction.

The resulting dye intermediate or color formers can be incorporated in coating solutions in the manners previously adopted in the manufacture of film elements containing immobile color formers or dyestuff intermediate in emulsion layers. The novel dye intermediates hereof may be dispersed in the binding agents while in a finely divided state using dispersing agents if desired and/or alkalies. In many cases it is practical to dissolve the dye intermediate or color former in a 5 to 10% caustic alkali to form a soluble paste. This may be then diluted with about 5 parts of water and about 1 part of alcohol added to 5% aqueous gelatin and the excess alkali neutralized with a mineral acid such as hydrochloric. The usual photographic coating ingredients, spreading agents, e. g. glycerine, saponine, long chain alkyl sulfates, etc., may be employed. The concentration of the coating solution is adjusted to yield the desired thickness.

The preferred developing agents which may be used in the dye coupling development steps hereof are derivatives of p-phenylenediamine and particularly the asymmetric dialkyl p-phenylenediamines of 1 to 4 carbon atoms, e. g. p-aminodimethylaniline, p-aminodiethylaniline, p-aminodibutylaniline, etc. Other developing agents which may be used include p-phenylenediamine itself, p-methylaminoaniline, p-ethylaminoaniline, p-aminophenol, N,N-diethyl-o-phenylenediamine, chloro-p-phenylenediamine, 1,2,5-toluylenediamine, 2-amino-5-diethylaminotoluene, p-amino-N-phenyimorpholine, N-p-aminophenylpiperidine, N-methyl-N-hydroxyethyl-p-phenylenediamine, N-butyl-N-hydroxy-ethyl-p-phenylenediamine, 2-amino-5-(N-butyl-N-hydroxyethyl) aminotoluene, β-γ-dihydroxypropyl-p-phenylenediamine, etc. These aromatic amino-developing agents in the form of their organic or inorganic acid salts may be used in the preparation of the developing solutions. The salts are in general more stable than the free bases. As examples of suitable salts, mention is made of the hydrochloride, sulfates, acetates, etc.

Further examples of developing agents that can be used in this process are—heterocyclic compounds containing benzene nuclei such as 1,2,3,4-tetrahydro-6-aminoquinoline, 1,2,3,4-tetrahydro-6 - amino - quinoxaline, etc. (U. S. Patent 2,163,820); o-aminophenols and their substitution products; N-hydroxy-alkyl p-phenylenediamines and di-N-hydroxyalkyl p-phenylenediamines (U. S. Patent 2,108,243); halogenated p-aminophenols (British Patent 467,087); p-phenylenediamine derivatives containing solubilizing groups in the positive radical connected to the N atom (U. S. Patent 2,163,166).

The dye intermediates are useful in various types of color processes wherein dye images are produced by color coupling development and azo coupling including azo reversal processes in the known manners. They may be used in conjunction with various types of reducible silver salt images, including silver halides, such as silver chloride, silver bromide, silver chlorobromide, silver chloride-bromide-iodide, etc. images; latent images, bleached images, reverse images, etc.

Certain of the novel dye intermediates are also useful in developer solutions, particularly those which contain solubilizing groups. However, it is often necessary or advisable to use wetting or dispersing agents to get them into solution. Suitable agents include higher alkyl sulfates and sulfonates, alkylated aromatic sulfonates, etc.

The condensation products of this invention are immobile or non-migratory in photographic emulsions and in addition they are photographically inert, that is they are not sensitive to light radiations. They lead to bright, haze-free images on color coupling development. The polymeric compounds may be easily prepared and are thus readily made available. The preferred products are readily soluble in dilute alkaline solutions and thus can be incorporated in colloid binding compositions such as gelatin emulsions without the necessity of resorting to special dispersion techniques.

When incorporated in photographic emulsion layers containing light sensitive silver salts and sensitizing dyes, stabilizers, fog inhibitors, it is found that many of the compounds do not adversely affect the sensitivity thereof. In addition the compounds are highly compatible with gelatin and do not lower the power of gelatin layers to adhere to the film base and to other colloid layers.

In addition to their use in color photography, the color formers may be used in coating and molding compositions, viscose dopes, etc.

As many apparently widely different embodiments of this invention may be made without departing from the spirit and scope thereof, it is to be understood that this invention is not to be limited to the specific embodiments herein except as defined by the appended claims.

What is claimed is:

1. A photographic composition comprising a water permeable organic colloid having uniformly distributed therethrough the polymeric reaction product of one mol of a ketaldone with one mol of a dye intermediate containing at least two ketaldone-reactive groups, at least one of which is an active methylene group and the other of which is taken from the group consisting of active methylene groups, primary amino, secondary amino, primary amide, primary sulfonamide and secondary sulfonamide groups.

2. A photographic composition comprising a water permeable organic colloid having uniformly distributed therethrough the polymeric reaction product of one mol of a ketaldone containing free acid groups taken from the class consisting of carboxylic and sulfonic acid groups with one mol of a dye intermediate containing at least two ketaldone reactive groups, at least one of which is an active methylene group and the other of which is taken from the group consisting of active methylene groups, primary amino, secondary amino, primary amide, primary sulfonamide and secondary sulfonamide groups.

3. A gelatin dispersion having uniformly distributed therethrough the polymeric reaction product of one mol of a ketaldone with a mol of a dye intermediate containing at least two ketaldone-reactive groups, at least one of which is an active methylene group and the other of which is taken from the group consisting of active methylene groups, primary amino, secondary amino, primary amide, primary sulfonamide and secondary sulfonamide groups.

4. A photographic element bearing at least one layer composed of a water permeable organic colloid having uniformly distributed therethrough the polymeric reaction product of one mol of a ketaldone with one mole of a dye intermediate containing at least two ketaldone-reactive groups, at least one of which is an active methylene group and the other of which is taken from the group consisting of active methylene groups, primary amino, secondary amino, primary amide, primary sulfonamide and secondary sulfonamide groups, said polymer being soluble to the extent of at least 1% in aqueous alkaline solutions.

5. A photographic element bearing at least one layer comprising a water permeable organic colloid containing a reducible silver salt, said element being further characterized in that it contains dispersed in an organic colloid layer the polymeric condensation product of one mol of a ketaldone with one mol of a dye intermediate containing at least two ketaldone-reactive groups, at least one of which is an active methylene group, and the other of which is taken from the group consisting of active methylene groups, primary amino, secondary amino, primary amide, primary sulfonamide groups.

6. A photographic element bearing at least one layer composed of a water permeable organic colloid containing the condensation product of one mol of a ketaldone with one mol of an aminopyrazolone containing an unsubstituted intracyclic active methylene group.

7. An element as set forth in claim 6 wherein said pyrazolone is 1-meta-aminophenyl-3-methyl-5-pyrazolone.

8. A photographic element bearing at least one layer composed of a water permeable organic colloid containing the condensation product of one mol of a ketaldone with one mol of an aminoacylacetanilide containing an unsubstituted active methylene group.

9. A photographic emulsion containing a light sensitive silver salt and a color former comprising the polymeric reaction product of a ketaldone with a dye intermediate containing at least two ketaldone-reactive groups, at least one of which is an active methylene group and the other of which is taken from the group consisting of active methylene groups, primary amino, secondary amino, primary amide, primary sulfonamide, and secondary sulfonamide groups, said polymer being soluble to the extent of at least 1% in aqueous alkaline solutions.

10. A photographic emulsion containing a light sensitive silver salt and a color former comprising the polymeric reaction product of one mol of a ketaldone containing free acid groups taken from the class consisting of carboxylic and sulfonic acid groups, with one mol of a dye intermediate containing at least two ketaldone-reactive groups, at least one of which is an active methylene group and the other of which is taken from the group consisting of active methylene groups, primary amino, secondary amino, primary amide, primary sulfonamide, and secondary sulfonamide groups, said polymer being soluble to the extent of at least 1% in aqueous alkaline solutions.

11. A photographic developer comprising an alkaline solution containing a color coupling developing agent and a color former comprising the polymeric reaction product of a ketaldone with a dye intermediate containing at least two ketaldone-reactive groups, at least one of which is an active methylene group and the other of which is taken from the group consisting of active methylene groups, primary amino, secondary amino, primary amide, primary sulfonamide, and secondary sulfonamide groups.

12. The process which comprises developing a photographic element containing a reducible silver salt image record with a color coupling developer in the presence of the polymeric reaction product of a ketaldone with a dye intermediate containing at least two ketaldone-reactive groups, at least one of which is an active methylene group and the other of which is taken from the group consisting of active methylene groups, primary amino, secondary amino, primary amide, primary sulfonamide, and secondary sulfonamide groups.

13. The process which comprises developing a photographic element containing a reducible silver salt image record with an arylene diamino developer having an unsubstituted amino group in the presence of the polymeric reaction product of one mol of a ketaldone with one mol of a dye intermediate containing at least two ketaldone-reactive groups at least one of which is an active methylene group and the other of which is taken from the group consisting of active methylene groups, primary amino, secondary amino, primary amide, primary sulfonamide, and secondary sulfonamide groups.

14. The process which comprises developing a photographic element containing a reducible silver salt image record with an arylene diamino developer having an unsubstituted amino group in the presence of the polymeric reaction product of one mol of a ketaldone containing free acid groups taken from the class consisting of carboxylic and sulfonic acid groups, with one mol of a dye intermediate containing at least two ketaldone-reactive groups at least one of which is an active methylene group and the other of which is taken from the group consisting of active methylene groups, primary amino, secondary amino, primary amide, primary sulfonamide, and secondary sulfonamide groups.

15. The process which comprises developing a photographic element containing a reducible silver salt image record with an arylene diamine developing agent having an unsubstituted amino group in the presence of the polymeric reaction product of one mol of a ketaldone containing free acid groups taken from the class consisting of carboxylic and sulfonic acid groups with one mol of an amino pyrazolone containing an intracyclic methylene group.

16. A photographic element bearing at least one layer composed of a water permeable organic colloid containing a reducible silver salt and the polymeric condensation product of one mol of para-acetoacetsulfanilamide with one mol of benzaldehyde-o-sodium sulfonate and formaldehyde.

17. A photographic element bearing at least one layer composed of a water permeable organic colloid containing a reducible silver salt and the polymeric condensation product of one mol of 1-meta-aminophenyl-3-methyl-5-pyrazolone with one mol of formaldehyde.

DAVID M. McQUEEN.